F. A. STEELE.
APPARATUS FOR BUILDING UP PLIES OF PLASTIC MATERIAL.
APPLICATION FILED AUG. 29, 1918.
1,363,441. Patented Dec. 28, 1920.
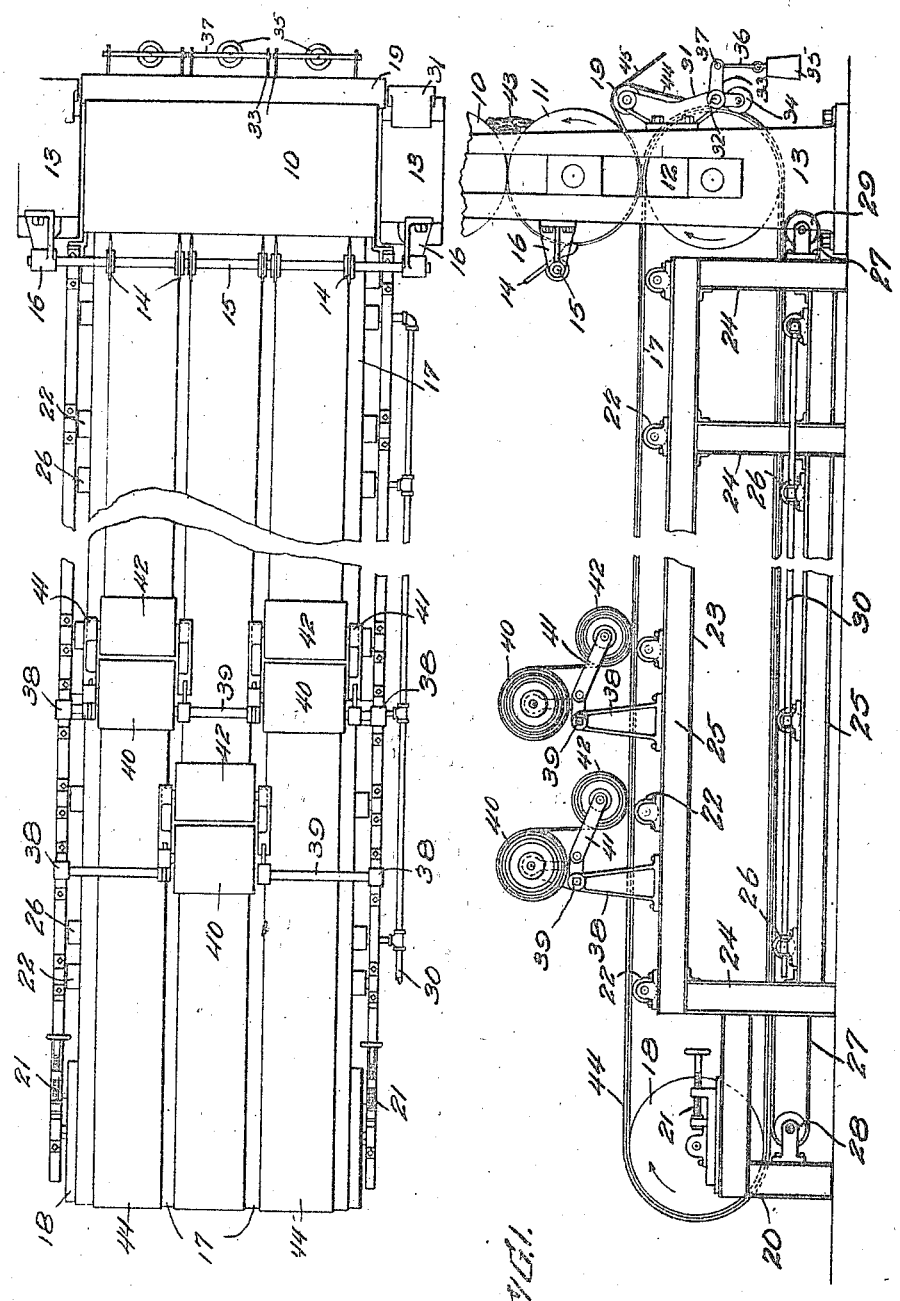
Inventor
Frank A. Steele.
By
Attorney.

UNITED STATES PATENT OFFICE.

FRANK A. STEELE, OF AKRON, OHIO, ASSIGNOR TO THE GOODYEAR TIRE & RUBBER COMPANY, OF AKRON, OHIO, A CORPORATION OF OHIO.

APPARATUS FOR BUILDING UP PLIES OF PLASTIC MATERIAL.

1,363,441.       Specification of Letters Patent.       Patented Dec. 28, 1920.

Application filed August 29, 1918. Serial No. 251,908.

*To all whom it may concern:*

Be it known that I, FRANK A. STEELE, a citizen of the United States, and resident of Akron, Summit county, Ohio, have invented new and useful Improvements in Apparatus for Building up Plies of Plastic Material, of which the following is a specification.

My present invention relates to improvements in an apparatus for building up plies of plastic material.

The present method of building up stock of plastic material, such as a rubber compound, is to calender a predetermined thickness of the material, build up a slab of several of these thicknesses or plies on any suitable bench or table, and roll them down. This method is objectionable by reason of the fact that plies can be made only in comparatively short lengths (about three feet) and require considerable handling, and that the plies of material are at all times exposed to the air and foreign elements, which have to be excluded before the several plies can be rolled down together.

In the present embodiment of my invention, I propose to provide a suitable structure arranged in close proximity to the calender, and make use of a continuously moving belt which is operatively connected to the calender and upon which the several thicknesses or plies of rubber material are built up directly from the calender.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 represents a broken side elevational view of my improved construction, the calender being illustrated more or less diagrammatically; and Fig. 2 is a top plan view thereof.

As shown in the drawings, the calender comprises three rolls, 10, 11 and 12, rotatably mounted in side supports 13, and a series of cutting knives 14 adjustably mounted on a bar 15, carried by a pair of brackets 16 attached to the side supports 13. In use, the two top rolls 10 and 11 of the calender will be set or spaced the required distance apart, and the lower roll 12 will be spaced a distance from the middle roll 11 that is greater than the thickness of the belt and the finally built up plies of material on the belt, as will be later understood.

A belt 17 encircling the lower calender roll 12 and also encircling an idler roll 18, is constantly driven by the calender roll 12 and is adapted to receive from the calender roll 11 the various plies of material which pass over an idler roll 19 after the sheet of material made by the rollers 10 and 11 has been cut longitudinally by the knives 14.

The bearings for the idler roll 18 are mounted in an adjustable manner on a suitable structure 20 and suitable take-up devices 21 are provided to adjust the bearings to keep an even tension upon the belt 17.

In use, the belt 17 may be approximately 80 to 100 feet long, and to support the belt in its travel, idler rolls 22 are preferably mounted on the top of a supporting structure 23 of any suitable design. For the purpose of illustration, I have shown the supporting structure 23 as consisting of a plurality of legs 24, and upper and lower horizontal beams 25 connected to the legs 24; all of which is of channel iron construction securely bolted or otherwise fastened together. The supporting structure 23 as just described, is provided on each side of the traveling belt 17 and it forms a suitable support for the idler rolls 22 and also for a plurality of idler rolls 26, which support a belt 27 at the lower part of the supporting structure 23.

The rubber material which is passed from the calender to the belt 17 being warm and semi-plastic, it is preferably held against the lower stretch of the belt 17 by the belt 27, which passes around suitably mounted rolls 28 and 29. The belt 27 may be cooled to cool the plastic material by passing water through the rolls 26 by means of suitable piping 30 which is connected to the rolls 26. Although I have illustrated both the rolls 26 and the belt 27 to support the plies of material along the lower stretch of the belt 17, it will be understood that either device can be used without the other, should it be found desirable so to do.

As shown, the roller 19 is arranged adjacent to the calender roll 11 and is rotatably mounted on the upper end portions of the brackets 31 which brackets are suitably secured to the side supports 13. Between the lower end portions of the brackets 31 extends a rod 32, on which are pivotally mounted the angular arms 33 which are disposed at a lower level than, but substantially in alinement with the knives 14. On the lower end portions of pairs of the angular arms 33 are rotatably mounted the pressure rolls 34, which are pressed against the calender roll 12 by the weights 35 on the rods 36 which are connected to bars 37 extending between the upper end portions of the pairs of angular arms 33. On the upper part of the supporting structure 23 are suitably mounted the stands 38 between pairs of which are connected the bars 39, which suitably carry rolls of lining material 40, and the pairs of pivoted arms 41 which have bearing in their lower free end portions the stock rolls 42.

From the foregoing description, the construction, manner of use and the advantages of the improved apparatus will be apparent to those skilled in the art. It will be understood that the mass of crude rubber material 43 may be placed to pass between the rolls 10 and 11 of the calender by which the material is pressed into a comparatively thin sheet which passes around the lower portion of the roll 11 after being cut by the knives 14 into strips of material 44. The latter and the waste strips 45 are passed over the idler roller 19; the waste strips 45 being discarded, and the strips or plies 44 being passed downwardly from the roller 19 to the belt 17 which passes downwardly on the front portion of the roll 12. It will be seen that after laying down on the belt 17 one strip or ply 44 of the length of the belt 17, other plies can be laid down on the first ply until the stock is built up by the plies to the desired thickness. In passing around the roll 12 the plies of material are pressed by the pressure rolls 34. After stock of the desired thickness is built up from the plies, it is cut transversely and one end portion of the stock, together with an end portion of the lining material 40, are passed around the stock roll 42 and are wound on the stock roll in consequence of rotation of the stock roll through the instrumentality of the moving belt 17.

The particular description and illustration of my invention have been given for the purpose of a full and complete explanation only, and I do not wish any limitations of the claims to be made therefrom unless the limitations are required by reason of the prior art.

What I claim is:

1. The combination with a calender, of means for building up plies of material made by said calender, said means including a belt passing around one of the rolls of the calender and adapted to receive the plies of material from said calender.

2. The combination with a calender, of means for building up plies of material made by said calender, said means including a belt passing around one of the rolls of the calender and adapted to receive the plies of material from said calender, and a roll for pressing the plies of material on said belt.

3. The combination with a calender, of means for building up plies of material made by said calender, said means including a belt operatively connected to the calender and adapted to receive the plies of material from said calender.

4. The combination with a calender, of means for building up plies of material made by said calender, said means including a belt passing around one of the rolls of the calender and adapted to receive the plies of material from said calender, and means for supporting the belt.

5. The combination with a calender, of means for building up plies of material made by said calender, said means including a belt passing around one of the rolls of the calender, and adapted to receive the plies of material from said calender, and a device for holding the plies of material on the lower stretch of said belt.

6. The combination with a calender, of means for building up plies of material made by said calender, said means including a belt passing around one of the rolls of the calender, and adapted to receive the plies of material from said calender, and means for cooling the plies of material.

7. The combination with a calender, of means for building up plies of material made by said calender, said means including a belt passing around one of the rolls of the calender and adapted to receive the plies of material from said calender, a device for holding the plies of material on the lower stretch of said belt, and means for cooling the plies of material.

8. The combination with a calender, of means for building up plies of material made by said calender, said means including a belt passing around one of the rolls of the calender, a device for supporting the belt, a device for holding the plies of material on the lower stretch of said belt, and means for cooling the plies of material.

9. The combination with a calender, of means for building up plies of material made by said calender, said means including a belt passing around one of the rolls of the calender, and a roller over which the plies of material pass from the calender to the belt.

10. The combination with a calender, of means for building up plies of material made by said calender, said means including a belt passing around one of the rolls of the calender, a roller over which the plies of material pass from the calender to the belt, and a roll for pressing the plies of material on said belt.

11. The combination with a calender, of means for building up plies of material made by said calender, said means including a belt passing around one of the rolls of the calender, a roller over which the plies of material pass from the calender to the belt, a roll for pressing the plies of material on the belt, a device for supporting the belt, a device for holding the plies of material on the lower stretch of the belt, and means for cooling the plies of material.

12. The combination with a calender, of means for building up plies of material made by said calender, said means including a belt passing around one of the rolls of the calender, a roller over which the plies of material pass from the calender to the belt, a roll for pressing the plies of material on the belt, a device for supporting the belt, a device for holding the plies of material on the lower stretch of belt, means for cooling the plies of material, and stock rolls operatively connected to the belt for receiving the built-up plies of material.

13. The combination with a calender, of means for building up plies of material made by said calender, said means including a belt passing around one of the rolls of the calender, a roll for pressing the plies of material on said belt, and stock rolls operatively connected to the belt for receiving the built-up plies of material.

14. The combination with a calender, of means comprising a belt for building up plies of material made by said calender, said means operatively connected to said calender, a roller over which the plies of material pass from the calender to the belt, a roll for pressing the plies of material on said belt, and a stock roll operatively connected to the belt for receiving the built-up plies of material.

15. The combination with a calender, said calender including a cutting device for separating the calendered material into strips, of means for simultaneously building up each strip upon itself, said means including an endless belt passing around a roll of the calender, and means operable by said belt for receiving said built up strips.

16. The combination with a calender, said calender including a cutting device for separating the calendered material into strips, of means for simultaneously building up each strip upon itself, said means including an endless belt passing around a roll of the calender, means associated with one stretch of said belt for cooling the strips, and means operable by the other stretch of the belt for receiving the built up strips.

17. The combination with a calender, said calender including a cutting device for separating the calendered material into strips, of means for simultaneously building up each strip upon itself, said means including an endless belt passing around a roll of the calender, presser means adjacent said roll for pressing said strips together, means for holding said strips against the lower stretch of the belt, devices associated with said last means for cooling the strips, and means operable by the upper stretch of the belt for reeling up the built up strips.

In witness whereof, I have hereunto signed my name in the presence of two subscribing witnesses.

FRANK A. STEELE.

Witnesses:
R. S. TROGNER,
E. C. SEADENHAM.